UNITED STATES PATENT OFFICE.

DANIEL H. MORRISON, OF PHILADELPHIA, PENNSYLVANIA.

PAPER FLOOR-COVERING.

SPECIFICATION forming part of Letters Patent No. 237,578, dated February 8, 1881.

Application filed December 13, 1880. (No specimens.)

*To all whom it may concern:*

Be it known that I, DANIEL H. MORRISON, a citizen of the United States, residing at Philadelphia, in the county of Philadelphia and State of Pennsylvania, have invented a certain new and useful Paper Floor-Covering; and I do declare the following to be a full, clear, and exact description of the invention, which will enable others skilled in the art to which it appertains to make and use the same.

The object of my invention is to make a handsome floor-covering which is durable and cheap. It makes the floor thoroughly air-tight, thus keeping out all impure air from the cellar, making the atmosphere pure. It does away with carpets, matting, oil-cloth, and other floor-coverings, and it may be washed or scrubbed at pleasure.

To carry my invention into effect, I first have the floor thoroughly cleaned. The holes and cracks are then filled with "paper putty," made by soaking newspaper in paste, which paste is made of wheat-flour, water, and ground alum, as follows: to one (1) pound of wheat-flour add three (3) quarts of water and a table-spoonful of ground alum, and mix thoroughly. The floor is then covered with paste made of wheat-flour, water, and ground alum, as follows: to one (1) pound of wheat-flour add three (3) quarts of water and a table-spoonful of ground alum, and mix together. Over this paste put on a thickness of Manila or hardware paper. If two layers are desired, a second covering of paste is put on the first layer of Manila paper, and then the second thickness of Manila paper put on. This is allowed to dry thoroughly. The Manila paper is then covered with paste and a layer of wall-paper of any style or design that is desired put on. After allowing this to thoroughly dry I cover it with two or more coats of sizing made by dissolving one-half ($\frac{1}{2}$) pound of white glue in two (2) quarts of hot water. After allowing this to dry put on one (1) coat of "hard oil-finish varnish," which comes and is bought already prepared. This is allowed to dry thoroughly, when the floor is ready for use.

Having thus fully described my invention, what I claim, and desire to secure by Letters Patent, is—

The herein-described process of making paper floor-covering to be used in place of carpets, matting, oil-cloth, &c., being applied and put down in the same manner that wall-paper is put upon the wall—that is, being fast to the floor—consisting of paper putty, paste, Manila or hardware paper, wall-paper, sizing, and hard oil-finish varnish, in the manner specified.

DANIEL H. MORRISON.

Witnesses:
HARRY J. SCOTT,
H. R. GREENE.